United States Patent
Sowpati et al.

(10) Patent No.: US 12,413,524 B2
(45) Date of Patent: Sep. 9, 2025

(54) ACCESS CONTROL FOR RESTRICTED ENTITIES

(71) Applicant: Salesforce, Inc., San Francisco, CA (US)

(72) Inventors: Praveenkumar Sowpati, Bangalore (IN); Jose Lejin P J, Bangalore (IN); Ramanjaneyulu Y Talla, Bangalore (IN)

(73) Assignee: Salesforce, Inc., San Francisco, CA (US)

( * ) Notice: Subject to any disclaimer, the term of this patent is extended or adjusted under 35 U.S.C. 154(b) by 230 days.

(21) Appl. No.: 18/303,314

(22) Filed: Apr. 19, 2023

(65) Prior Publication Data
US 2024/0356854 A1    Oct. 24, 2024

(51) Int. Cl.
G06F 15/173    (2006.01)
H04L 47/125    (2022.01)

(52) U.S. Cl.
CPC .................... *H04L 47/125* (2013.01)

(58) Field of Classification Search
None
See application file for complete search history.

(56) References Cited

U.S. PATENT DOCUMENTS

2021/0034669 A1*    2/2021    McLaughlin ....... G06F 16/8365

* cited by examiner

*Primary Examiner* — Wing F Chan
*Assistant Examiner* — Andrew Woo
(74) *Attorney, Agent, or Firm* — Holland & Hart LLP

(57) ABSTRACT

Methods, apparatuses, and computer-program products are disclosed. A method may include activating, in a processing entity, a connection agent and a manifest, the manifest including a data signature and an endpoint type that are associated with the processing entity. The method may include generating, based on the data signature, the endpoint type, or both, one or more load balanced dynamic endpoints configured for access, by the connection agent and via one or more application programming interfaces, to a repository including access configurations for the processing entity. The method may include retrieving, via the one or more load balanced dynamic endpoints and from the repository, one or more first access configurations of the plurality of access configurations and the one or more first access configurations may be associated with the processing entity.

19 Claims, 10 Drawing Sheets

ACCESS CONTROL FOR RESTRICTED ENTITIES

FIELD OF TECHNOLOGY

The present disclosure relates generally to database systems and data processing, and more specifically to access controls and configurations for restricted entities.

BACKGROUND

A cloud platform (i.e., a computing platform for cloud computing) may be employed by multiple users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

In some cloud platform scenarios, access controls and configurations for processing entities may be employed. However, such approaches may be improved.

DETAILED DESCRIPTION

Figure 1:
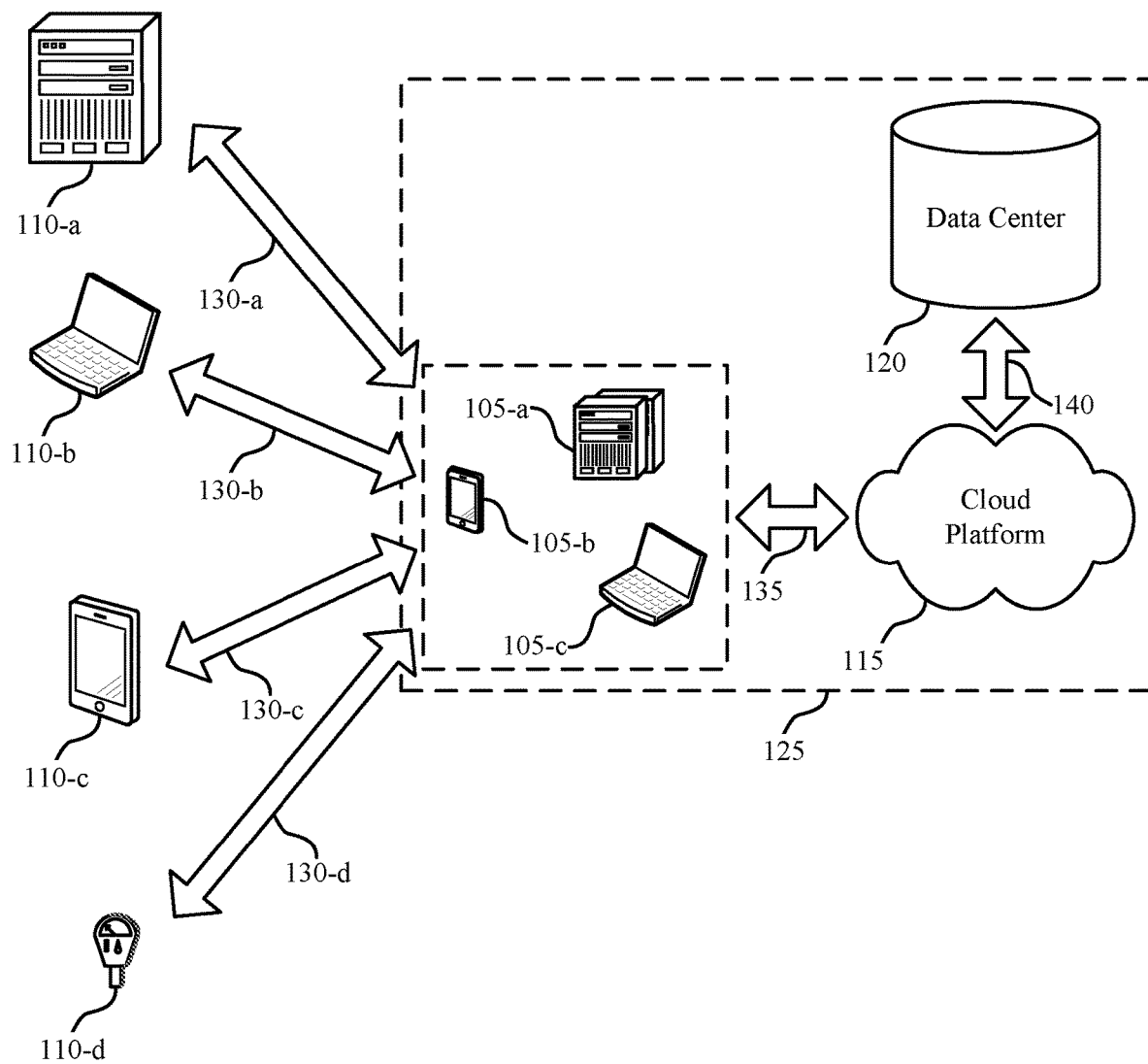
FIG. 1 illustrates an example of a system for data processing that supports access control for restricted entities in accordance with examples provided herein.

Service-oriented architectures running in private cloud substrates may include highly restricted entities (e.g., subnetworks, groups of devices, or individual devices) that may be subject to restrictions due to increased security or limited access (e.g., due to sensitive or confidential data). It is technically complex to configure access control lists in such restricted environments (e.g., even administrators may not have permissions to configure access for entities in the restricted environment). Further, existing approaches to configure access control may operate by directly calling application programming interface (API) endpoints or via commands that directly interface the entity with other resources. However, such approaches may not function in highly restricted entities or environments, as, for example, such APIs or commands may not be accessible or such an access may pose a security risk. Additionally, some datacenters may include thousands or tens of thousands of entities that may be operating in a restricted environment or may be restricted entities, thereby requiring complicated access configuration at large scale. Further, different entities may have network topologies or characteristics (e.g., entities may include different types, formats, or configurations of devices or nodes), and configuration solutions may not be generalized across such different topologies or characteristics. As such, access control for such environments may be improved.

Techniques for access control in highly restricted environments at scale may be employed. For example, an agent object or program may be inserted or activated in a restricted processing entity alongside a manifest for the entity (e.g., that describes one or more characteristics associated with the processing entity). The agent may allow a system or application server to configure the connection (e.g., access control configurations or parameters) for the restricted entity. For example, the system may configure a collection of one or more dynamic endpoints (e.g., randomly generated endpoints) that may be used for retrieving a configuration for the restricted entity. Further, the system may select or create one or more such dynamic endpoints based on information included in the manifest for the entity and different entities may be associated with different characteristics that may lead to different information being included in respective manifests, so that the dynamic endpoints may be selected or created to suit the different restricted entities' configurations needs. These various dynamic endpoints may include or provide access to one or more APIs that the restricted entities may use to retrieve their configuration information. Once the agent is aware of the various endpoints available, the agent may then connect to the APIs through the dynamic endpoints to retrieve the associated configuration(s) for the entity.

In this way, even restricted entities with limitations due to security practices (e.g., that may not otherwise be configured for access due to such restrictions, such as a lack of access to APIs or direct configuration by administrators) may be configured for access. Additionally, or alternatively, security levels or protocols may be maintained for such restricted entities. For example, calls are made from the restricted entities and no calls made outside the restricted cloud substrate are directed into the restricted cloud substrate. Further, storage that may maintain the access configurations may also be kept secure and access may be permitted by the processing entities using the dynamic endpoints while denying access to other entities.

In some examples, once the dynamic endpoints are used to configure a processing entity, the dynamic endpoints may be disabled or may be self-disabling (e.g., to increase security). Additionally, or alternatively, in some examples, one or more dynamic endpoints may be reassigned for use by a different processing entity that may access the same resources that a first processing entity accessed. In some examples, the dynamic endpoints may be mapped to one or more services that may retrieve one or more aspects of one or more access configurations. Further, in some examples, the dynamic endpoints may be randomly generated (e.g., address of such endpoints may be randomly generated) to support security considerations.

Aspects of the disclosure are initially described in the context of an environment supporting an on-demand database service. Aspects of the disclosure are then described with reference to access control systems and a process flow. Aspects of the disclosure are further illustrated by and described with reference to apparatus diagrams, system diagrams, and flowcharts that relate to access control for restricted entities.

FIG. 1 illustrates an example of a system 100 for cloud computing that supports access control for restricted entities in accordance with various aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-a), a smartphone (e.g., cloud client 105-b), or a laptop (e.g., cloud client 105-c). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to at least some applications, data, and database information within cloud platform 115 based on the associated security or permission level, and may not have access to others.

Contacts 110 may interact with the cloud client 105 in person or via phone, email, web, text messages, mail, or any other appropriate form of interaction (e.g., interactions 130-a. 130-b, 130-c, and 130-d). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-a), a laptop (e.g., contact 110-b), a smartphone (e.g., contact 110-c), or a sensor (e.g., contact 110-d). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135, and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

The system 100 may be an example of a multi-tenant system. For example, the system 100 may store data and provide applications, solutions, or any other functionality for multiple tenants concurrently. A tenant may be an example of a group of users (e.g., an organization) associated with a same tenant identifier (ID) who share access, privileges, or both for the system 100. The system 100 may effectively separate data and processes for a first tenant from data and processes for other tenants using a system architecture, logic, or both that support secure multi-tenancy. In some examples, the system 100 may include or be an example of a multi-tenant database system. A multi-tenant database system may store data for different tenants in a single database or a single set of databases. For example, the multi-tenant database system may store data for multiple tenants within a single table (e.g., in different rows) of a database. To support multi-tenant security, the multi-tenant database system may prohibit (e.g., restrict) a first tenant from accessing, viewing, or interacting in any way with data or rows associated with a different tenant. As such, tenant data for the first tenant may be isolated (e.g., logically isolated) from tenant data for a second tenant, and the tenant data for the first tenant may be invisible (or otherwise transparent) to the second tenant. The multi-tenant database system may additionally use encryption techniques to further protect tenant-specific data from unauthorized access (e.g., by another tenant).

Additionally, or alternatively, the multi-tenant system may support multi-tenancy for software applications and infrastructure. In some cases, the multi-tenant system may maintain a single instance of a software application and architecture supporting the software application in order to serve multiple different tenants (e.g., organizations, customers). For example, multiple tenants may share the same software application, the same underlying architecture, the same resources (e.g., compute resources, memory resources), the same database, the same servers or cloud-based resources, or any combination thereof. For example, the system 100 may run a single instance of software on a processing device (e.g., a server, server cluster, virtual machine) to serve multiple tenants. Such a multi-tenant system may provide for efficient integrations (e.g., using application programming interfaces (APIs)) by applying the integrations to the same software application and underlying architectures supporting multiple tenants. In some cases, processing resources, memory resources, or both may be shared by multiple tenants.

As described herein, the system 100 may support any configuration for providing multi-tenant functionality. For example, the system 100 may organize resources (e.g., processing resources, memory resources) to support tenant isolation (e.g., tenant-specific resources), tenant isolation within a shared resource (e.g., within a single instance of a resource), tenant-specific resources in a resource group, tenant-specific resource groups corresponding to a same subscription, tenant-specific subscriptions, or any combination thereof. The system 100 may support scaling of tenants within the multi-tenant system, for example, using scale triggers, automatic scaling procedures, scaling requests, or any combination thereof. In some cases, the system 100 may implement one or more scaling rules to enable relatively fair sharing of resources across tenants. For example, a tenant may have a threshold quantity of processing resources, memory resources, or both to use, which in some cases may be tied to a subscription by the tenant.

For example, a cloud client 105 may be included in a restricted processing entity associated with a restricted cloud substrate (e.g., which may be associated with a restricted business group or business unit). The cloud client 105 may not allow direct access or configuration of access control due to restricted or secure characteristics. As such, the cloud platform 115 may activate a connection agent and a manifest in the cloud client 105 and generate one or more dynamic endpoints In some cases, administrators may not have direct access to entities or nodes operating in highly restricted environments (e.g., due to security measures or configurations). In some examples, even senior or core administrators do not have access. Additionally, some API commands or even entire APIs may not be accessible by an entity within the restricted environment. Further, many cloud platforms involve multiple data centers or large quantities of entities with complex configurations, topologies, hierarchies, network organizations, device types, and other considerations.

The subject matter described herein reduces or eliminates such challenges by inserting agents into the entities that communicate with randomly generated endpoints connected to retrieval services, some or all of which may be contained within the restricted environment. These retrieval services may then connect to external, secure storage that includes one or more aspects of one or more access configurations that may be used to configure access for the restricted entities. In this way, even though administrators may not have access to entities, or some APIs may not otherwise be available, the agent injected into the restricted entity may connect to the randomly generated API endpoints that, in some cases, may be specifically generated for the entity and allow the access configuration information to be retrieved. These API endpoints may then be disabled after usage and sometimes regenerated dynamically to prevent unauthorized devices from accessing the access configuration information, maintaining security.

For example, in response to detecting the presence of a processing entity (which itself may include one or more devices), the system may inject the connection agent into the entity. The entity may already have a manifest describing characteristics or other information associated with the entity. Using these characteristics, the system may generate one or more dynamic endpoints for the connection agent to connect to and retrieve access configuration information from secure storage (e.g., that may be outside the restricted environment). For example, some devices may be configured differently from other devices, which may result in different methods or information used to configure access for the devices. By accounting for these differences, the system can provide a secure connection for the connection agent to retrieve the configuration information and configure access for the entity, even though an administrator may not be able to directly configure such information and there are security restrictions or limitations in place in the restricted environment.

It should be appreciated by a person skilled in the art that one or more aspects of the disclosure may be implemented in a system 100 to additionally or alternatively solve other problems than those described herein. Further, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
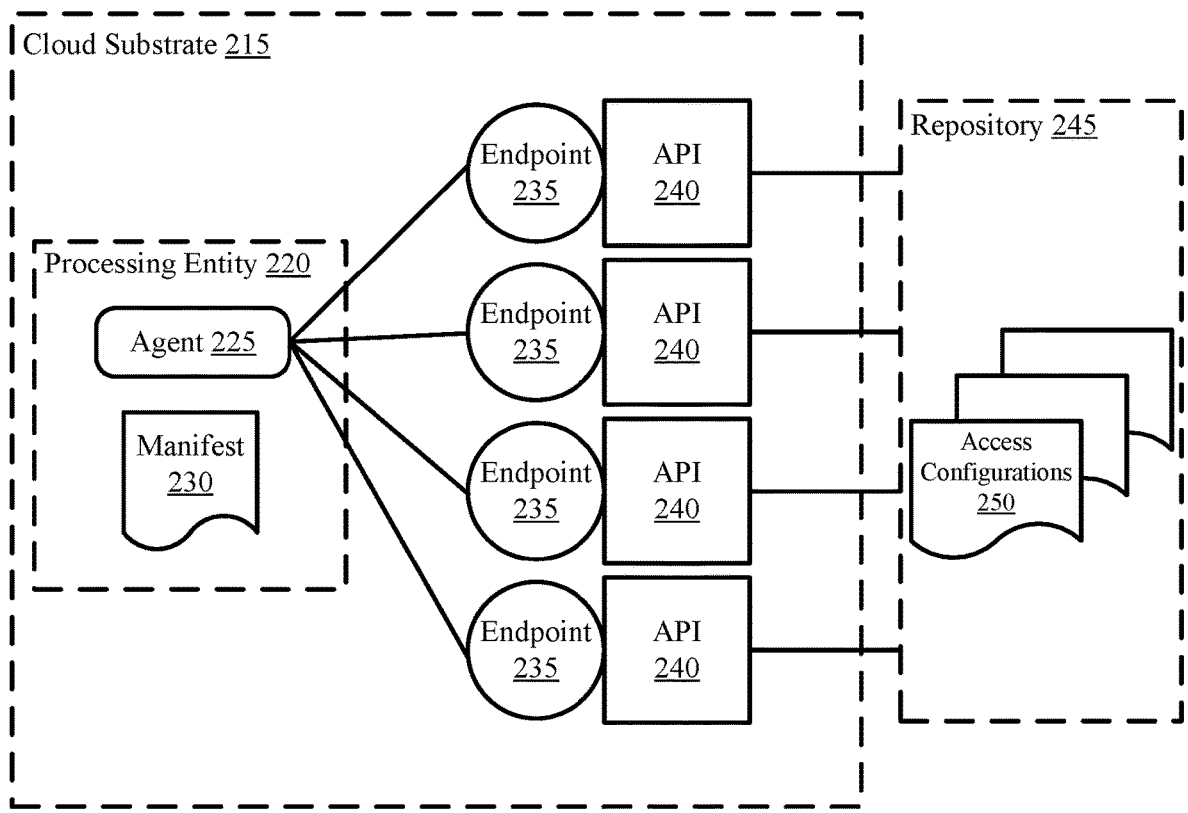
FIG. 2 shows an example of an access control system that supports access control for restricted entities in accordance with examples provided herein.

FIG. 2 shows an example of an access control system 200 that supports access control for restricted entities in accordance with examples provided herein.

In some cases, a cloud substrate 215 may be described as an underlying infrastructure (e.g., such as a physical datacenter infrastructure that may be managed by an organization). The cloud substrate 215 may, in some cases, be a private cloud substrate. The substrate may include different categories, divisions, or other organizational elements (e.g., data center, network, storage, rack provisioning, architecture, hardware engineering, one or more other elements, or any combination thereof) that may form a base layer for products in the organization to operate and innovate on.

In some examples, service-oriented architectures running in private cloud substrates may include large quantities of highly restricted entities. It is not straightforward to configure access configurations (e.g., access control lists (ACLs)) in these restricted environments. For example, most service administrators may not have access to such restricted entities, and even senior or core system administrators may not have direct access. Such entities may be associated with commerce, government operations, or other operations that may involve increased security or restrictions.

In some examples, access configuration information (e.g., including ACLs) may include configuration information associated with network traffic (e.g., L3 or L4 network layer traffic, one or more other network layers, or any combination thereof). For example, such information may include internet protocol (IP) addresses, ports, and domain names, as well as other configuration information such as settings, permissions, policies, or other configuration information.

Some other approaches for configuring access for processing entities directly call API endpoints or issue commands that are directly executed in entities. However, in restricted environments, such APIs or commands may not be accessible. Further, data centers often operate on large scales, including large quantities of entities. Such entities may include sub-networks, service pods, or other data center divisions or organizations, and configuration of such is not simple. Further, in some cases, different entities may include different network topologies different types of devices or nodes, one or more other differing characteristics, or any combination thereof. As such, approaches for configuring access for such entities cannot be simply generalized for a configuration solution.

As such the techniques and architecture described herein provides efficient, scalable, and reliable manners of configuring access for entities in highly restricted data environments.

For example, the access control system 200 may inject the agent 225 and the manifest 230 into the processing entity 220. The manifest 230 may include a data signature of data associated with the processing entity 220, one or more compatible endpoint types for the processing entity 220, other information, or any combination thereof. The access control system 200 may generate the endpoints 235 to which the agent 225 may connect. The endpoints 235 may be randomly generated endpoints that may be generated specifically for the processing entity 220. For example, the access control system 200 may read the information stored in the manifest 230 (e.g., the data signature of data associated with the processing entity 220, one or more compatible endpoint types for the processing entity 220, other information, or any combination thereof) and generate the endpoints 235 based on such information. The endpoints 235 may be associated with corresponding APIs 240 that may connect to the repository 245 that is located outside the cloud substrate 215, and these APIs 240 may be mapped to retrieval services for retrieving one or more access configurations 250. The repository 245 may include or store the one or more access configurations 250 that may themselves include entire configurations, partial configurations, or other information that may be used by the agents 225 to configure the processing entity 220 for access even though the processing entity 220, the cloud substrate 215, or both may operate in a restricted environment.

Figure 3:
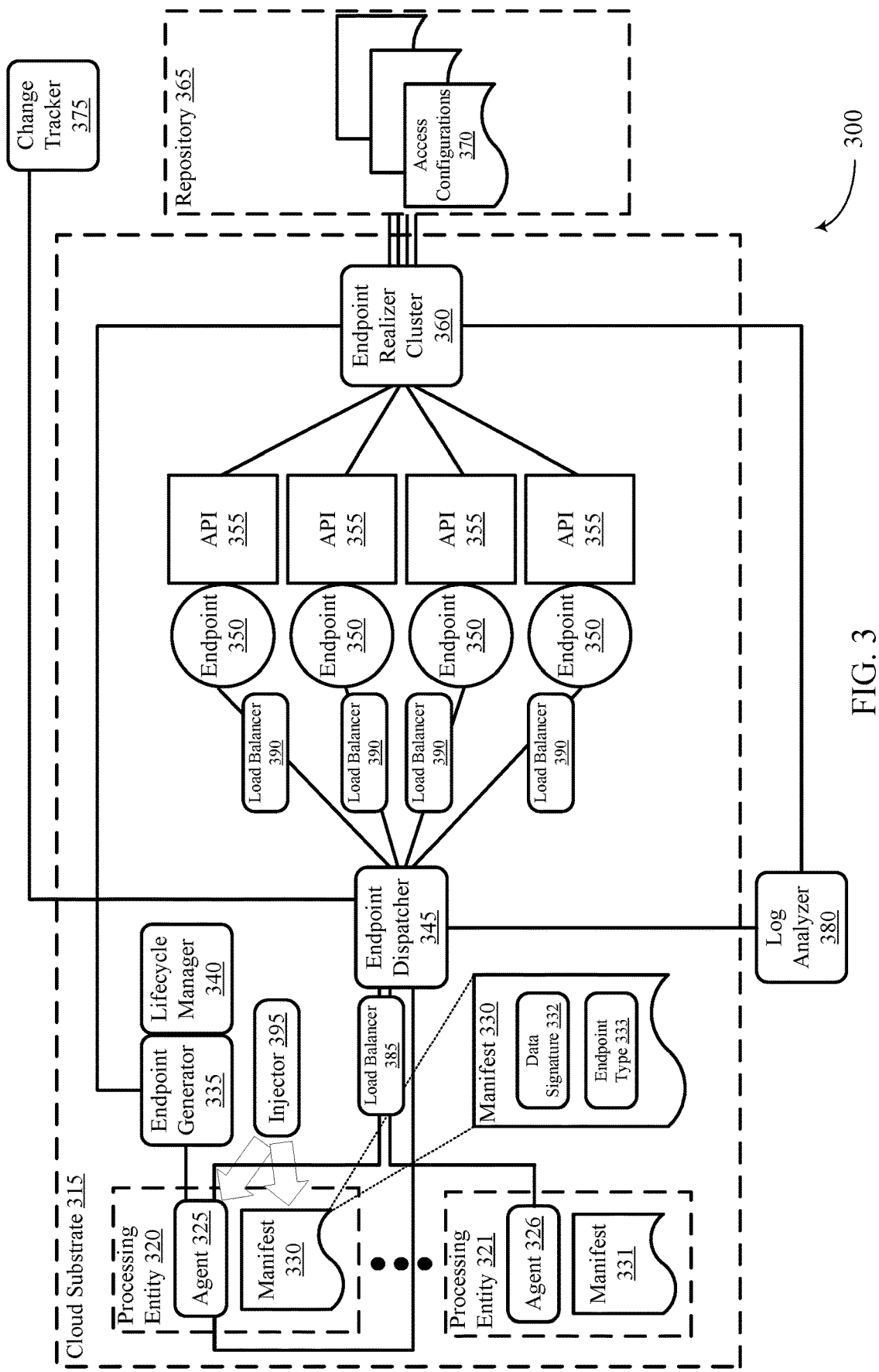
FIG. 3 shows an example of an access control system that supports access control for restricted entities in accordance with examples provided herein.

FIG. 3 shows an example of an access control system 300 that supports access control for restricted entities in accordance with examples provided herein. Though some example connections, data paths, or arrangements are shown and described, other connections, data paths, and arrangements are possible and contemplated by the subject matter described herein.

The access control system 300 may include a cloud substrate 315 that may itself include entities, devices, networks, subnetworks, or other organizational divisions of one or more data centers for processing. For example, the cloud substrate 315 may include multiple highly restricted processing entities 320 such as network devices, logical network groups (e.g., container pods), one or more collections of heterogeneous services, service groups, other processing devices, nodes, or services, or any combination thereof. In some cases, a processing entity 320 may include many types of devices.

Since these processing entities 320 may be restricted for access, there may be no direct way to configure them. As such, in response to the processing entity 320 being deployed or activated, the access control system 300 may cause the injector 395 to inject the agent 325, the manifest 330, or both into the processing entity 320. For example, in some cases, the manifest 330 may be included as part of the activation or provisioning of the processing entity 320, or it may be added (e.g., by the injector 395) at another time. In some examples, the access control system 300 may monitor for the presence of the processing entity 320 and may inject the agent 325 into the processing entity 320 alongside an already present manifest 330 in the processing entity 320. In some examples, the agent 325 may activate automatically after or in response to being injected into the processing entity 320.

In some examples, the manifest 330 may not include actual endpoint names, addresses, or paths, but may instead include one or more of a data signature 332, an endpoint type 333, or both. In some examples, the data signature 332 may include or indicate a data format, a quantity of data, a data configuration rate, one or more dependent configurations, or any combination thereof. In some examples, the endpoint type may include or indicate a representational state transfer (REST) API model, a global remote procedure call (RPC) API model, an input schema, an output schema, or any combination thereof.

In some examples, the access control system 300 may include an endpoint generator 335. The endpoint generator 335 may monitor for the presence of the processing entity 320 and (e.g., in response to detecting the processing entity 320), may scan the processing entity 320 (e.g., to obtain additional information about the processing entity 320 for generating the endpoints 350 that are associated with the APIs 355). In some examples, to detect the processing entity 320, to scan the processing entity 320, or both, the injector 395 may use dynamic discovery methods, such as port polling, network traffic change monitoring, network advertisement monitoring, other monitoring or scanning approaches, or any combination thereof.

In some examples, the endpoint generator 335 (e.g., based on scanning the processing entity 320) may obtain an indication of an available endpoint of the agent 325 and may communicate with the agent 325 via such an endpoint. The endpoint generator 335 may generate one or more dynamic endpoints 350 to which the processing entity 320 may connect to fetch the access configurations 370. In some cases, the endpoints 350 may be reused, regenerated, or reassigned for another processing entity 321 (that may include its own agent 326 and manifest 331) to use. Further, the endpoints 350 may be associated with one or more load balancers 390, as, in some examples, multiple processing entities 320 may connect to the same endpoint(s) 350. In some examples, the agent 325, the endpoint generator 335, or both may read the information stored in the manifest 330 (e.g., the data signature 332, the endpoint type 333, or both) and may determine what type or configuration of one or more endpoints 350 are to be generated for the processing entity 320. Additionally, such endpoints 350 may include authentication built into the endpoints 350 so that access to the endpoints 350 may be restricted to the processing entity 320 or multiple processing entities 320 for which access is intended or specified (e.g., based on information in the manifest 330).

The processing entity 320 (e.g., either using the agent 325 or by other means) may then connect to the endpoints 350. However, to form such a connection, the processing entity 320) may connect to the load balancer 385 (e.g., which may be used to balance the load of multiple processing entities 320) and may then connect to the endpoint dispatcher 345. The endpoint dispatcher 345 may be a collection of such dispatchers operating in a cluster. In some examples, the endpoint dispatcher 345 may translate, encode, or decode information passed between the processing entity 320 and the endpoints 350 (e.g., API requests, data, access configuration information, logs, or other information associated with the operation of the access control system 300). For example, the processing entity 320 includes a first type of device, then the endpoint dispatcher 345 may translate, decode, encode, or otherwise convert information to support communications of the first type of device in the processing entity 320 in one or more formats that are compatible with the first type of device.

By connection to the endpoints 350 of the APIs 355, the processing entity 320 may gain access to one or more services that may provide the configuration information for access for the processing entity 320 to other resources. The system may offer such access to services using the endpoint realizer cluster 360. The endpoint realizer cluster 360 may itself be an entity within the cloud substrate 315 that may itself be a restricted entity or may operate within a restricted environment. The endpoint realizer cluster 360 may include a collection of services that may communicate with the processing entity 320 to retrieve configuration information and may also communicate with one another. For example, if an endpoint 350 is to be used with combined information from multiple services, the endpoint 350 may be mapped (e.g., by the endpoint realizer cluster 360) to the corresponding services. Such services may themselves communicate, such as to generate consolidated data responses. In some examples, correct information may be formed by nested calls of multiple services until the requested data is complied, organized, transmitted, or any combination thereof.

In some examples, the APIs 355 are not simple APIs, but may be a collection of different sets of APIs serving the processing entity 320 to retrieve configuration information. In some cases, a single processing entity 320 may connect to hundreds of such APIs 355 to retrieve different access data or configurations, such as ACL ingress block information, ACL egress block information, ACL settings, ACL permissions, other access configuration information, or any combination thereof.

As the endpoints are dynamically generated, the component lifecycle manager 340 (e.g., which may be coupled with the endpoint generator 335) may manage the lifecycles of the endpoints 350. For example, if any of the endpoints are not used by any processing entity 320, the endpoint may be self destroyed or disabled. For at least this purpose, references may be automatically tracked and, optionally, a lifetime or expiration for the endpoints 350 may be applied.

Once the endpoints 350 are active, the agent 325 may receive information about the endpoints 350 (e.g., endpoint configurations, addresses, or other information) used to connect to the endpoints 350. The agent 325 may then connect or trigger the endpoints 350 of the APIs 355 to begin retrieval of the access configuration information. Such triggering may, for example, be done via representational state transfer (REST) or global remote procedure calls (RPC).

In response, the endpoint realizer cluster 360 may connect to the repository 365 which may be an external data source. For example, the 365 may be any data storage implementation that may include or store the access configurations 370. The access configurations 370 may include complete access configurations, partial access configurations, other access configuration information, or any combination thereof, that the processing entity 320 may use to configure access. For example, the repository 365 may include configuration information such as a global L3/L4 configuration of networks.

This repository 365 may be outside of the highly restricted environment (e.g., outside of the cloud substrate 315). By using this architecture, no call from outside is made inside such a highly restricted environment. In other words, the call direction may be from the highly restricted environment (e.g., the cloud substrate 315), and may be performed on an "as-needed" or "on-demand" basis. Further, the repository 365 may be configured such that the access configurations 370 may be pulled from the cloud substrate 315 or other highly restricted environment, and the access configurations 370 may not be pulled from a different environment or entity, including tight or strict authentication and authorization.

In some examples, the agent 325 may receive the access configurations 370 for the processing entity 320. The access configurations 370 may be translated, encoded, decoded, or otherwise altered to match a format associated with the processing entity 320 or one or more devices associated with the processing entity 320. In some examples, the agent 325 may process and validate the received access configurations 370. After passing the processing and validation, the agent 325 may convert the access configurations 370 or information included therein into one or more access policies, device configurations, or both, that may be pushed to one or more target devices, services, or entities of the processing entity 320. Once the one or more policies are pushed and activated in the targets, access configuration may be completed. However, in the case of errors at any point in the process, the agent 325 may resolve such errors by repeating one or more actions or operations or may alter one or more settings or configurations in efforts to retrieve and implement the access configurations 370. Additionally, or alternatively, the agent 325 may revert one or more changes made if an operation results in an error.

Throughout the various operations described herein, some or all of the different components or operations may generate logs and statistics. Such logs and statistics may be redirected to the endpoint dispatcher 345. The endpoint dispatcher 345 may transmit the logs and statistics to the log analyzer 380. In some examples, one or more formats of the logs and statics may be encrypted such that other entities besides the log analyzer 380 may not be able to read the logs and statistics. The log analyzer 380 may analyze, compile, and provide logs, statistics, results, other monitoring information, or any combination thereof to administrators on demand.

Further, the change tracker 375 may create work items, progress information, or other monitoring information that may be made available to management or administrators to maintain visibility on operations being performed in the restricted environment.

Figure 4:
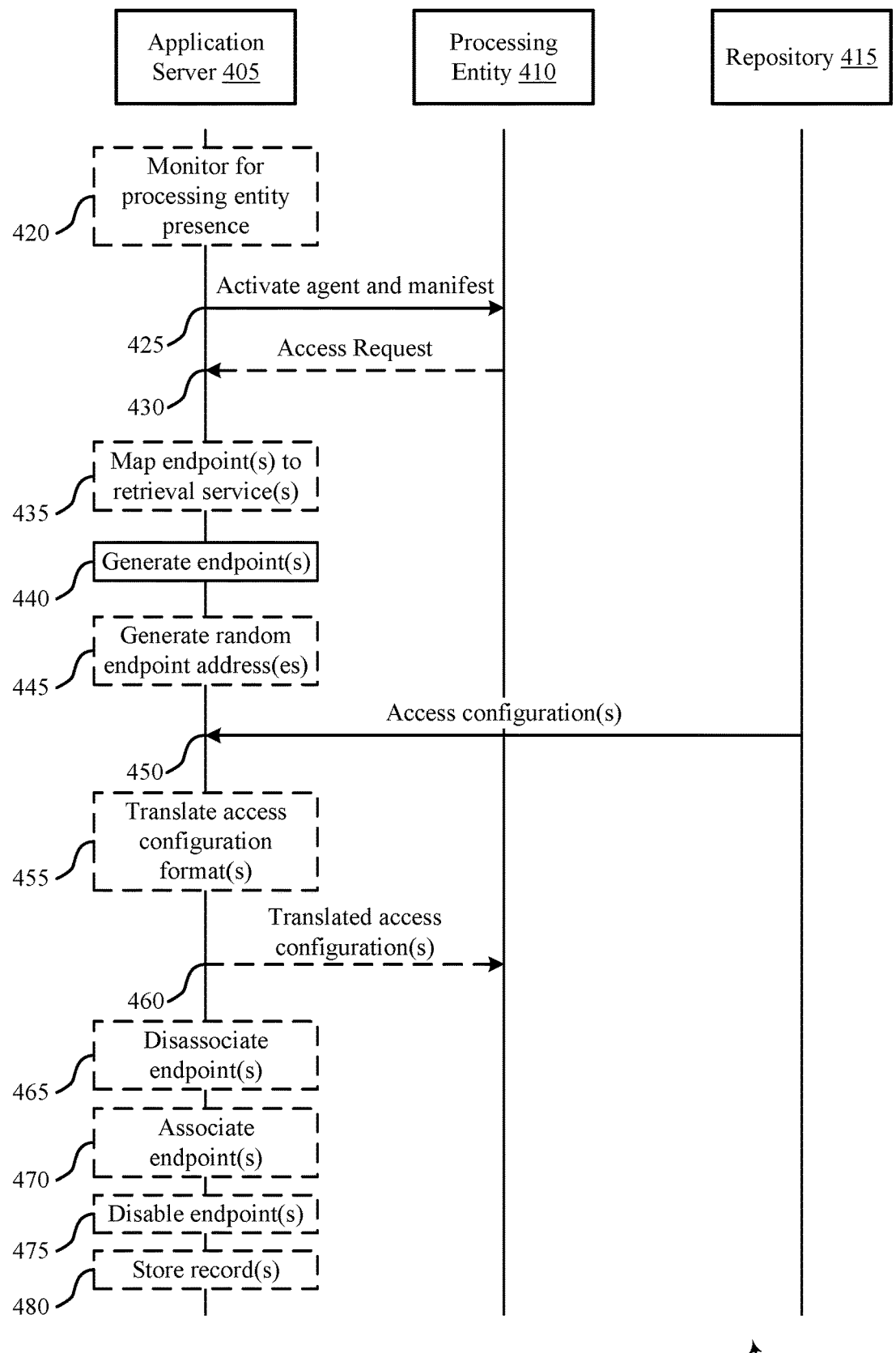
FIG. 4 shows an example of a process flow that supports access control for restricted entities in accordance with examples provided herein.

FIG. 4 shows an example of a process flow 400 that supports access control for restricted entities in accordance with examples provided herein. The process flow 400 may implement various aspects of the present disclosure described herein. The elements described in the process flow 400 (e.g., the application server 405, the processing entity 410, the repository 415, or any combination thereof) may be examples of similarly named elements described herein.

In the following description of the process flow 400, the operations between the various entities or elements may be performed in different orders or at different times. Some operations may also be left out of the process flow 400, or other operations may be added. Although the various entities or elements are shown performing the operations of the process flow 400, some aspects of some operations may also be performed by other entities or elements of the process flow 400 or by entities or elements that are not depicted in the process flow, or any combination thereof.

At 420, the application server 405 may monitor for a presence of the processing entity 410.

At 425, the application server 405 may activate, in a processing entity 410, a connection agent and a manifest, the manifest that may include a data signature and an endpoint type that are associated with the processing entity 410. In some examples, the application server 405 may activate, in the processing entity 410, the connection agent based on detecting the presence of the processing entity 410. In some examples, the data signature may indicate a data format, a quantity of data, a data configuration rate, one or more dependent configurations, or any combination thereof. In some examples, the endpoint type may indicate a representational state transfer (REST) API model, a global remote procedure call (RPC) API model, an input schema, an output schema, or any combination thereof.

At 430, the application server 405 may receive, from the connection agent, an access request indicating the one or more first access configurations; and At 435, the application server 405 may map the one or more load balanced dynamic endpoints to one or more access configuration retrieval services associated with the plurality of access configurations.

At 440, the application server 405 may generate, based on the data signature, the endpoint type, or both, one or more load balanced dynamic endpoints configured for access, by the connection agent and via one or more application programming interfaces, to a repository 415 that may include a plurality of access configurations for the processing entity 410. In some examples, the one or more load balanced dynamic endpoints disallow connections from processing entities different than the processing entity 410

At 445, the application server 405 may generate random endpoint addresses associated with the one or more load balanced dynamic endpoints.

At 450, the application server 405 may retrieve, via the one or more load balanced dynamic endpoints and from the repository 415, one or more first access configurations of the plurality of access configurations and the one or more first access configurations are associated with the processing entity 410. In some examples, the application server 405 may retrieve the one or more first access configurations based on the access request. In some examples, the application server 405 may retrieve the one or more first access configurations via the one or more access configuration retrieval services. In some examples, the plurality of access configurations comprises one or more access control lists, one or more internet protocol address configurations, one or more domain name configurations, one or more permissions configurations, one or more access policy configurations, one or more network layer configurations, one or more transport layer configurations, one or more ingress block configurations, one or more egress block configurations, or any combination thereof At 455, the application server 405 may translate the one or more first access configurations from a first format to a second format that corresponds to the processing entity 410.

At 460, the application server 405 may transmit the translated one or more first access configurations to the processing entity 410 via the connection agent.

At 465, the application server 405 may disassociate the one or more load balanced dynamic endpoints from the processing entity 410.

At 470, the application server 405 may associate the one or more load balanced dynamic endpoints with a second processing entity 410.

At 475, the application server 405 may disable the one or more load balanced dynamic endpoints based on retrieving, via the one or more load balanced dynamic endpoints, the one or more first access configurations.

At 480, the application server 405 may store one or more records (e.g., logs, work items, or other records, which may be associated with a log analyzer, a change tracker, or both, such as the log analyzer 380, the change tracker 375, or both) associated with activation of the connection agent, the manifest, or both, the generation of the one or more load balanced dynamic endpoints, a disablement of the one or more load balanced dynamic endpoints, a reassignment of the one or more load balanced dynamic endpoints, or any combination thereof.

Figure 5:
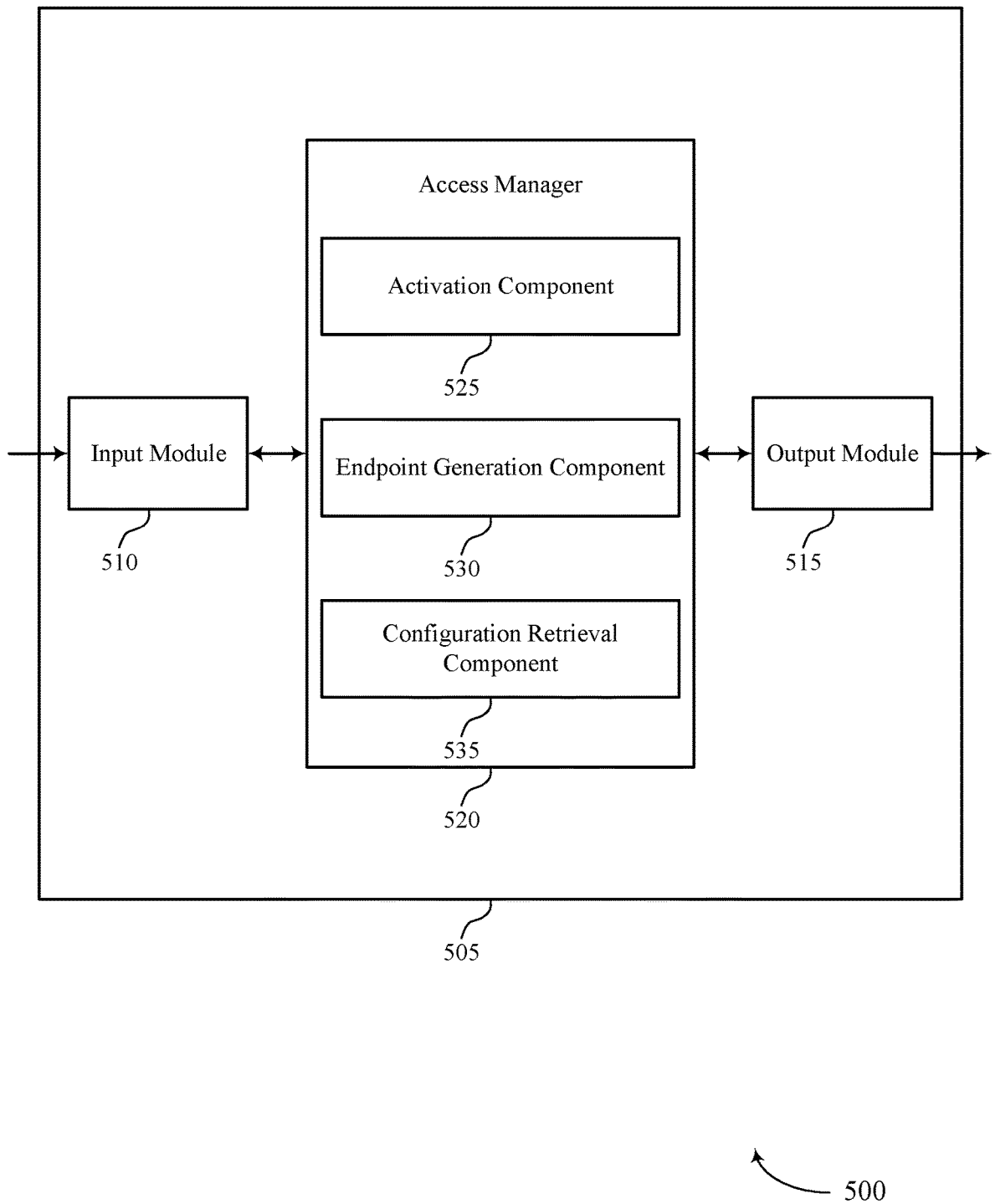
FIG. 5 shows a block diagram of an apparatus that supports access control for restricted entities in accordance with examples provided herein.

FIG. 5 shows a block diagram 500 of a device 505 that supports access control for restricted entities in accordance with examples provided herein. The device 505 may include an input module 510, an output module 515, and an access manager 520. The device 505 may also include a processor. Each of these components may be in communication with one another (e.g., via one or more buses).

The input module 510 may manage input signals for the device 505. For example, the input module 510 may identify input signals based on an interaction with a modem, a keyboard, a mouse, a touchscreen, or a similar device. These input signals may be associated with user input or processing at other components or devices. In some cases, the input module 510 may utilize an operating system such as iOS®, ANDROID®, MS-DOS®, MS-WINDOWS®, OS/2®, UNIX®, LINUX®, or another known operating system to handle input signals. The input module 510 may send aspects of these input signals to other components of the device 505 for processing. For example, the input module 510 may transmit input signals to the access manager 520 to support access control for restricted entities. In some cases, the input module 510 may be a component of an I/O controller 710 as described with reference to FIG. 7.

The output module 515 may manage output signals for the device 505. For example, the output module 515 may receive signals from other components of the device 505, such as the access manager 520, and may transmit these signals to other components or devices. In some examples, the output module 515 may transmit output signals for display in a user interface, for storage in a database or data store, for further processing at a server or server cluster, or for any other processes at any quantity of devices or systems. In some cases, the output module 515 may be a component of an I/O controller 710 as described with reference to FIG. 7.

For example, the access manager 520 may include an activation component 525, an endpoint generation component 530, a configuration retrieval component 535, or any combination thereof. In some examples, the access manager 520, or various components thereof, may be configured to perform various operations (e.g., receiving, monitoring, transmitting) using or otherwise in cooperation with the input module 510, the output module 515, or both. For example, the access manager 520 may receive information from the input module 510, send information to the output module 515, or be integrated in combination with the input module 510, the output module 515, or both to receive information, transmit information, or perform various other operations as described herein.

The access manager 520 may support data processing at an application server in accordance with examples as disclosed herein. The activation component 525 may be configured to support activating, in a processing entity, a connection agent and a manifest, the manifest including a data signature and an endpoint type that are associated with the processing entity. The endpoint generation component 530 may be configured to support generating, based on the data signature, the endpoint type, or both, one or more load balanced dynamic endpoints configured for access, by the connection agent and via one or more application programming interfaces, to a repository including a set of multiple access configurations for the processing entity. The configuration retrieval component 535 may be configured to support retrieving, via the one or more load balanced dynamic endpoints and from the repository, one or more first access configurations of the set of multiple access configurations, where the one or more first access configurations are associated with the processing entity.

Figure 6:
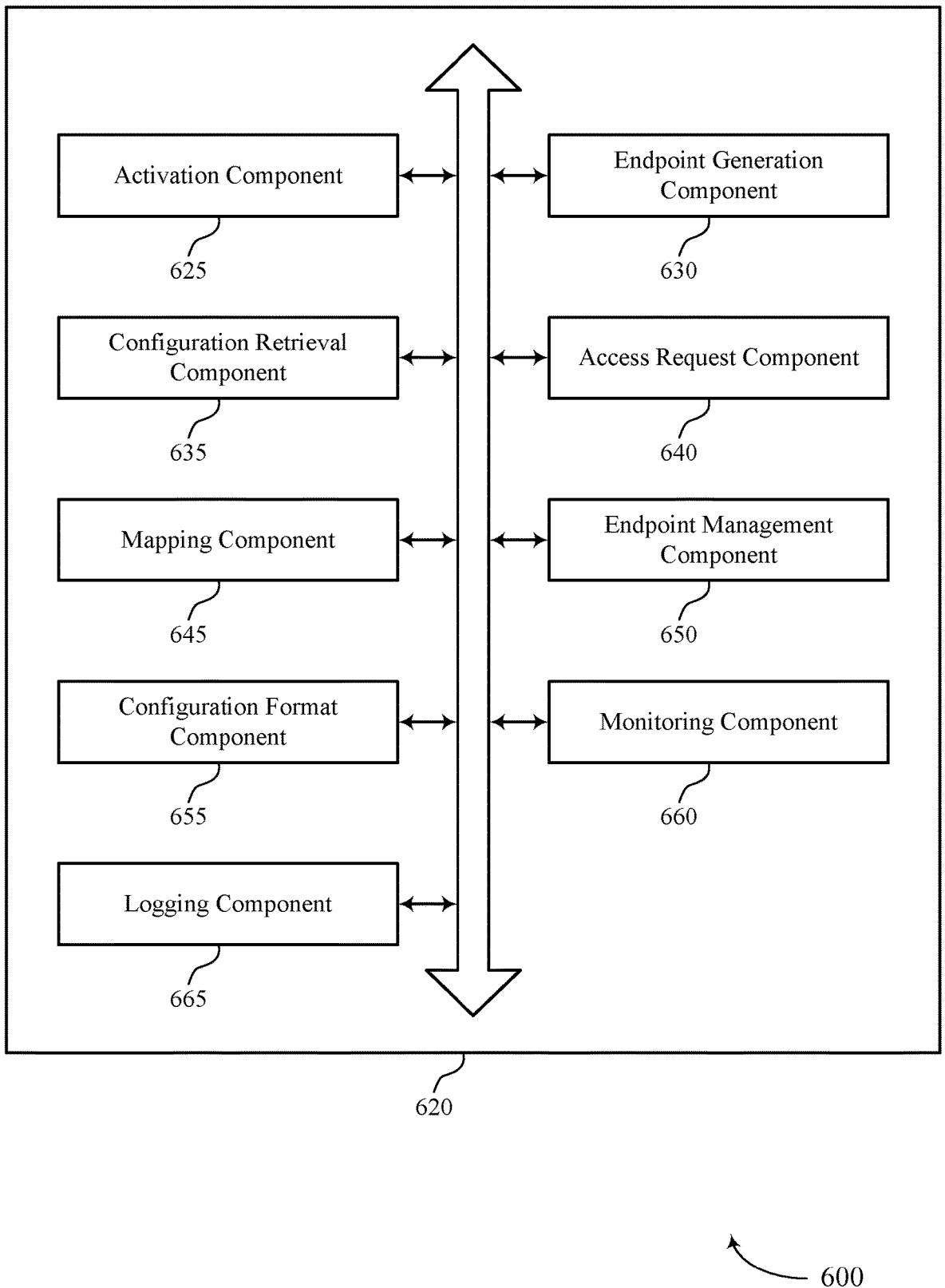
FIG. 6 shows a block diagram of an access manager that supports access control for restricted entities in accordance with examples provided herein.

FIG. 6 shows a block diagram 600 of an access manager 620 that supports access control for restricted entities in accordance with examples provided herein. The access manager 620 may be an example of aspects of an access manager or an access manager 520, or both, as described herein. The access manager 620, or various components thereof, may be an example of means for performing various aspects of access control for restricted entities as described herein. For example, the access manager 620 may include an activation component 625, an endpoint generation component 630, a configuration retrieval component 635, an access request component 640, a mapping component 645, an endpoint management component 650, a configuration format component 655, a monitoring component 660, a logging component 665, or any combination thereof. Each of these components may communicate, directly or indirectly, with one another (e.g., via one or more buses).

The access manager 620 may support data processing at an application server in accordance with examples as disclosed herein. The activation component 625 may be configured to support activating, in a processing entity, a connection agent and a manifest, the manifest including a data signature and an endpoint type that are associated with the processing entity. The endpoint generation component 630 may be configured to support generating, based on the data signature, the endpoint type, or both, one or more load balanced dynamic endpoints configured for access, by the connection agent and via one or more application programming interfaces, to a repository including a set of multiple access configurations for the processing entity. The configuration retrieval component 635 may be configured to support retrieving, via the one or more load balanced dynamic endpoints and from the repository, one or more first access configurations of the set of multiple access configurations, where the one or more first access configurations are associated with the processing entity.

In some examples, the access request component 640 may be configured to support receiving, from the connection agent, an access request indicating the one or more first access configurations. In some examples, the configuration retrieval component 635 may be configured to support retrieving the one or more first access configurations based on the access request.

In some examples, the mapping component 645 may be configured to support mapping the one or more load balanced dynamic endpoints to one or more access configuration retrieval services associated with the set of multiple access configurations. In some examples, the configuration retrieval component 635 may be configured to support retrieving the one or more first access configurations via the one or more access configuration retrieval services.

In some examples, the endpoint management component 650 may be configured to support disabling the one or more load balanced dynamic endpoints based on retrieving, via the one or more load balanced dynamic endpoints, the one or more first access configurations.

In some examples, the endpoint management component 650 may be configured to support disassociating the one or more load balanced dynamic endpoints from the processing entity. In some examples, the endpoint management component 650 may be configured to support associating the one or more load balanced dynamic endpoints with a second processing entity.

In some examples, the endpoint generation component 630 may be configured to support generating random endpoint addresses associated with the one or more load balanced dynamic endpoints.

In some examples, the configuration format component 655 may be configured to support translating the one or more first access configurations from a first format to a second format that corresponds to the processing entity. In some examples, the configuration format component 655 may be configured to support transmitting the translated one or more first access configurations to the processing entity via the connection agent.

In some examples, the monitoring component 660 may be configured to support monitoring for a presence of the processing entity. In some examples, the activation component 625 may be configured to support activating, in the processing entity, the connection agent based on detecting the presence of the processing entity.

In some examples, the logging component 665 may be configured to support storing one or more records associated with activation of the connection agent, the manifest, or both, the generation of the one or more load balanced dynamic endpoints, a disablement of the one or more load balanced dynamic endpoints, a reassignment of the one or more load balanced dynamic endpoints, or any combination thereof.

In some examples, the one or more load balanced dynamic endpoints disallow connections from processing entities different than the processing entity.

In some examples, the set of multiple access configurations include one or more access control lists, one or more internet protocol address configurations, one or more domain name configurations, one or more permissions configurations, one or more access policy configurations, one or more network layer configurations, one or more transport layer configurations, one or more ingress block configurations, one or more egress block configurations, or any combination thereof.

In some examples, the data signature indicates a data format, a quantity of data, a data configuration rate, one or more dependent configurations, or any combination thereof.

In some examples, the endpoint type indicates a representational state transfer (REST) API model, a global remote procedure call (RPC) API model, an input schema, an output schema, or any combination thereof.

Figure 7:
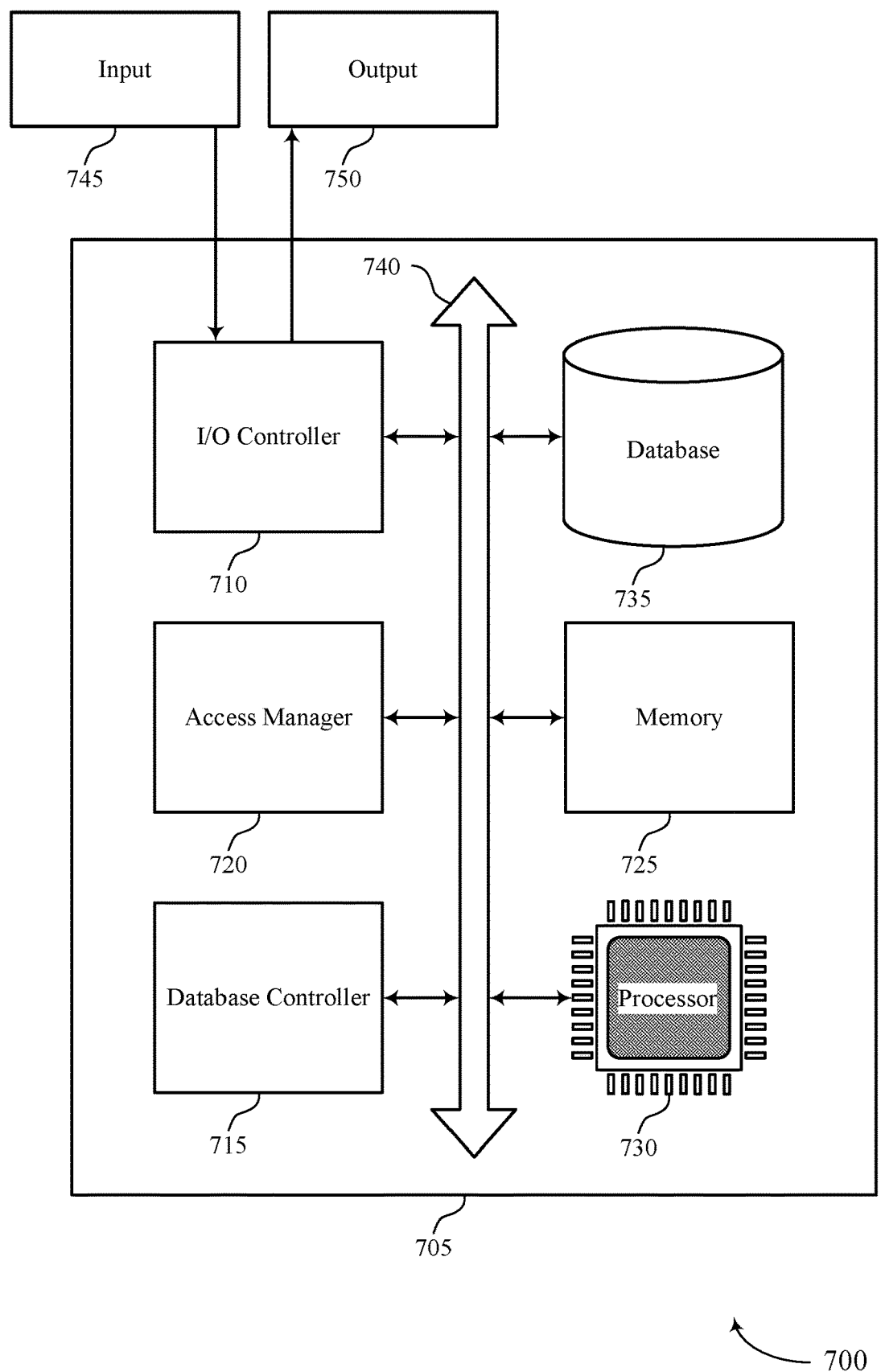
FIG. 7 shows a diagram of a system including a device that supports access control for restricted entities in accordance with examples provided herein.

FIG. 7 shows a diagram of a system 700 including a device 705 that supports access control for restricted entities in accordance with examples provided herein. The device 705 may be an example of or include the components of a device 505 as described herein. The device 705 may include components for bi-directional data communications including components for transmitting and receiving communications, such as an access manager 720, an I/O controller 710, a database controller 715, a memory 725, a processor 730, and a database 735. These components may be in electronic communication or otherwise coupled (e.g., operatively, communicatively, functionally, electronically, electrically) via one or more buses (e.g., a bus 740).

The I/O controller 710 may manage input signals 745 and output signals 750 for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. In other cases, the I/O controller 710 may represent or interact with a modem, a keyboard, a mouse, a touchscreen, or a similar device. In some cases, the I/O controller 710 may be implemented as part of a processor 730. In some examples, a user may interact with the device 705 via the I/O controller 710 or via hardware components controlled by the I/O controller 710.

The database controller 715 may manage data storage and processing in a database 735. In some cases, a user may interact with the database controller 715. In other cases, the database controller 715 may operate automatically without user interaction. The database 735 may be an example of a single database, a distributed database, multiple distributed databases, a data store, a data lake, or an emergency backup database.

Memory 725 may include random-access memory (RAM) and ROM. The memory 725 may store computer-readable, computer-executable software including instructions that, when executed, cause the processor 730 to perform various functions described herein. In some cases, the memory 725 may contain, among other things, a BIOS which may control basic hardware or software operation such as the interaction with peripheral components or devices.

The processor 730 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 730 may be configured to operate a memory array using a memory controller. In other cases, a memory controller may be integrated into the processor 730. The processor 730 may be configured to execute computer-readable instructions stored in a memory 725 to perform various functions (e.g., functions or tasks supporting access control for restricted entities).

The access manager 720 may support data processing at an application server in accordance with examples as disclosed herein. For example, the access manager 720 may be configured to support activating, in a processing entity, a connection agent and a manifest, the manifest including a data signature and an endpoint type that are associated with the processing entity. The access manager 720 may be configured to support generating, based on the data signature, the endpoint type, or both, one or more load balanced dynamic endpoints configured for access, by the connection agent and via one or more application programming interfaces, to a repository including a set of multiple access configurations for the processing entity. The access manager 720 may be configured to support retrieving, via the one or more load balanced dynamic endpoints and from the repository, one or more first access configurations of the set of multiple access configurations, where the one or more first access configurations are associated with the processing entity.

By including or configuring the access manager 720 in accordance with examples as described herein, the device 705 may support techniques for improved communication reliability, reduced latency, improved user experience related to reduced processing, reduced power consumption, more efficient utilization of communication resources, improved coordination between devices, longer battery life, improved utilization of processing capability, or any combination thereof.

Figure 8:
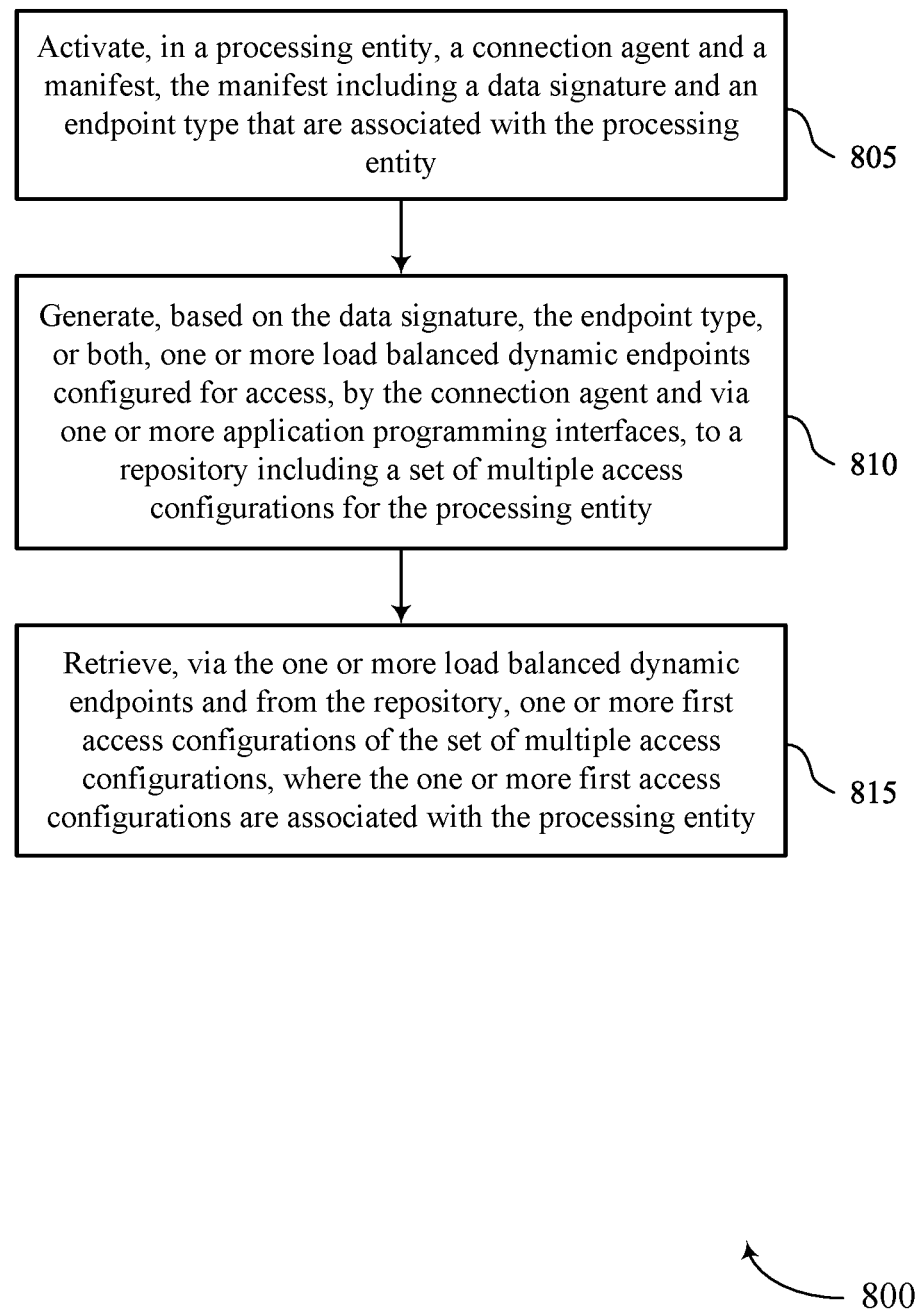
FIGS. 8 through 10 show flowcharts illustrating methods that support access control for restricted entities in accordance with examples provided herein.

FIG. 8 shows a flowchart illustrating a method 800 that supports access control for restricted entities in accordance with examples provided herein. The operations of the method 800 may be implemented by an application server or its components as described herein. For example, the operations of the method 800 may be performed by an application server as described with reference to FIGS. 1 through 7. In some examples, an application server may execute a set of instructions to control the functional elements of the application server to perform the described functions. Additionally, or alternatively, the application server may perform aspects of the described functions using special-purpose hardware.

At 805, the method may include activating, in a processing entity, a connection agent and a manifest, the manifest including a data signature and an endpoint type that are associated with the processing entity. The operations of 805 may be performed in accordance with examples as disclosed herein. In some examples, aspects of the operations of 805 may be performed by an activation component 625 as described with reference to FIG. 6.

At 810, the method may include generating, based on the data signature, the endpoint type, or both, one or more load balanced dynamic endpoints configured for access, by the connection agent and via one or more application programming interfaces, to a repository including a set of multiple access configurations for the processing entity. The operations of 810 may be performed in accordance with examples as disclosed herein. In some examples, aspects of the operations of 810 may be performed by an endpoint generation component 630 as described with reference to FIG. 6.

At 815, the method may include retrieving, via the one or more load balanced dynamic endpoints and from the repository, one or more first access configurations of the set of multiple access configurations, where the one or more first access configurations are associated with the processing entity. The operations of 815 may be performed in accordance with examples as disclosed herein. In some examples, aspects of the operations of 815 may be performed by a configuration retrieval component 635 as described with reference to FIG. 6.

Figure 9:
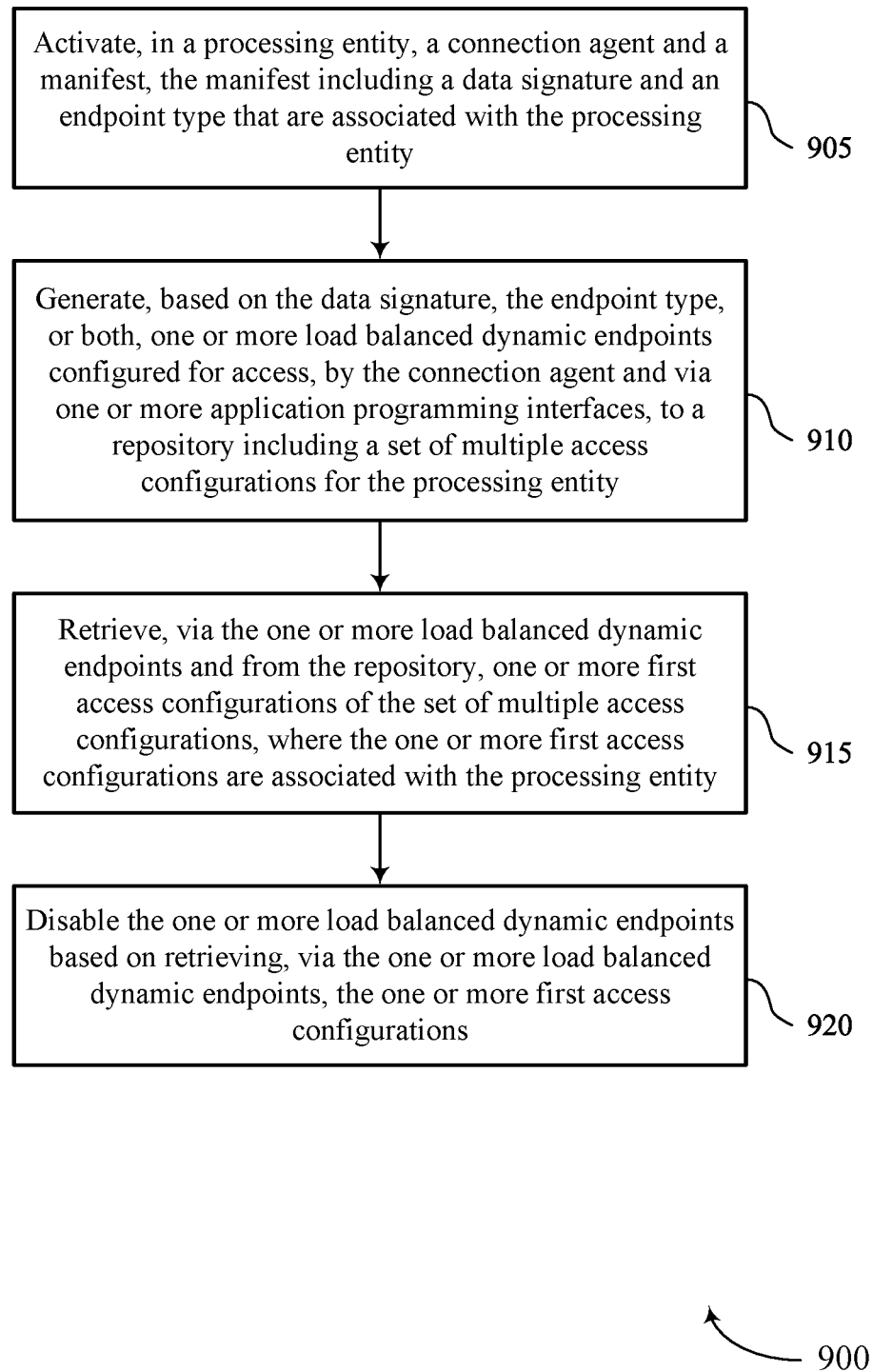

FIG. 9 shows a flowchart illustrating a method 900 that supports access control for restricted entities in accordance with examples provided herein. The operations of the method 900 may be implemented by an application server or its components as described herein. For example, the operations of the method 900 may be performed by an application server as described with reference to FIGS. 1 through 7. In some examples, an application server may execute a set of instructions to control the functional elements of the application server to perform the described functions. Additionally, or alternatively, the application server may perform aspects of the described functions using special-purpose hardware.

At 905, the method may include activating, in a processing entity, a connection agent and a manifest, the manifest including a data signature and an endpoint type that are associated with the processing entity. The operations of 905 may be performed in accordance with examples as disclosed herein. In some examples, aspects of the operations of 905 may be performed by an activation component 625 as described with reference to FIG. 6.

At 910, the method may include generating, based on the data signature, the endpoint type, or both, one or more load balanced dynamic endpoints configured for access, by the connection agent and via one or more application programming interfaces, to a repository including a set of multiple access configurations for the processing entity. The operations of 910 may be performed in accordance with examples as disclosed herein. In some examples, aspects of the operations of 910 may be performed by an endpoint generation component 630 as described with reference to FIG. 6.

At 915, the method may include retrieving, via the one or more load balanced dynamic endpoints and from the repository, one or more first access configurations of the set of multiple access configurations, where the one or more first access configurations are associated with the processing entity. The operations of 915 may be performed in accordance with examples as disclosed herein. In some examples, aspects of the operations of 915 may be performed by a configuration retrieval component 635 as described with reference to FIG. 6.

At 920, the method may include disabling the one or more load balanced dynamic endpoints based on retrieving, via the one or more load balanced dynamic endpoints, the one or more first access configurations. The operations of 920 may be performed in accordance with examples as disclosed herein. In some examples, aspects of the operations of 920 may be performed by an endpoint management component 650 as described with reference to FIG. 6.

Figure 10:
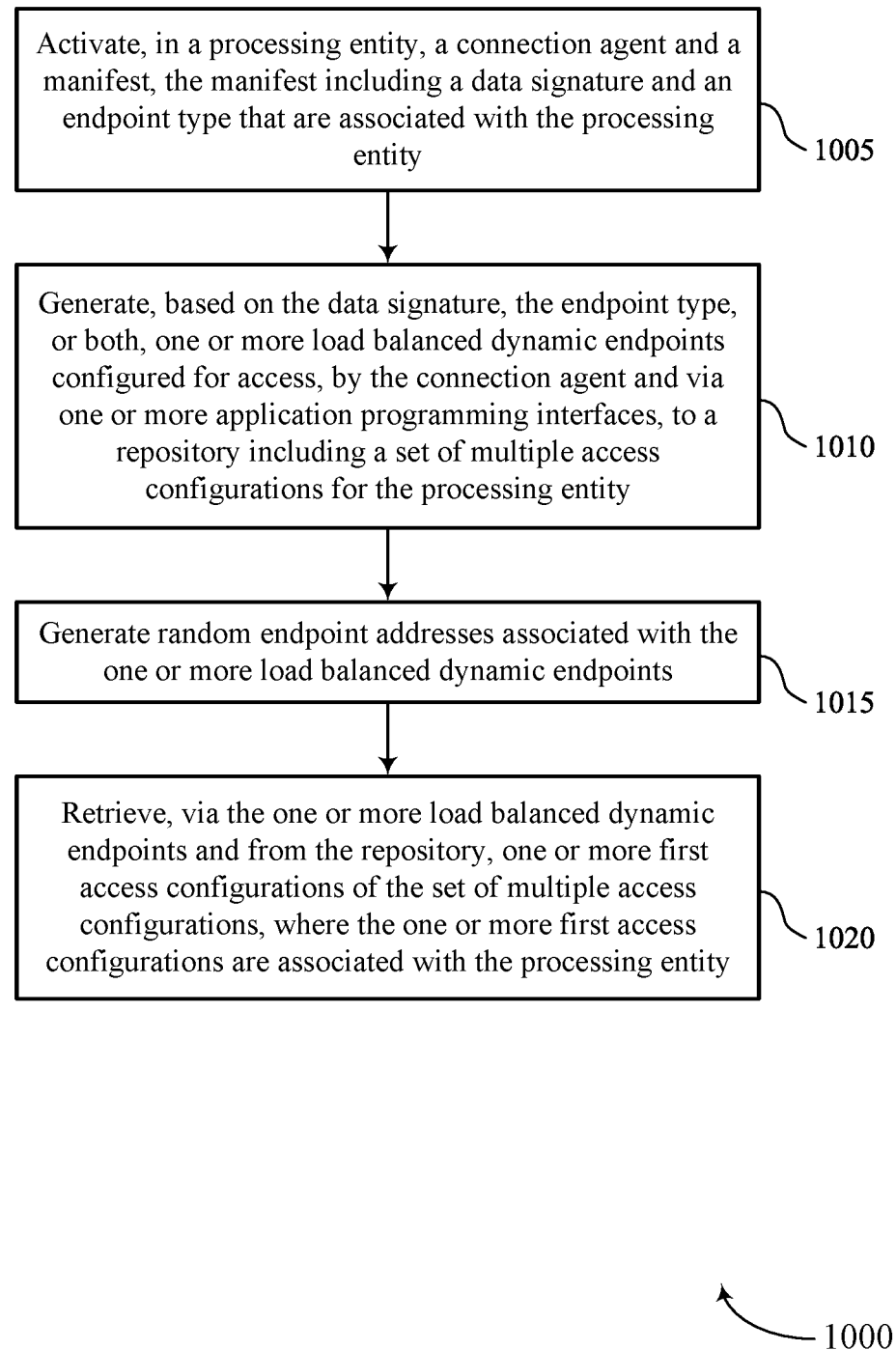

FIG. 10 shows a flowchart illustrating a method 1000 that supports access control for restricted entities in accordance with examples provided herein. The operations of the method 1000 may be implemented by an application server or its components as described herein. For example, the operations of the method 1000 may be performed by an application server as described with reference to FIGS. 1 through 7. In some examples, an application server may execute a set of instructions to control the functional elements of the application server to perform the described functions. Additionally, or alternatively, the application server may perform aspects of the described functions using special-purpose hardware.

At 1005, the method may include activating, in a processing entity, a connection agent and a manifest, the manifest including a data signature and an endpoint type that are associated with the processing entity. The operations of 1005 may be performed in accordance with examples as disclosed herein. In some examples, aspects of the operations of 1005 may be performed by an activation component 625 as described with reference to FIG. 6.

At 1010, the method may include generating, based on the data signature, the endpoint type, or both, one or more load balanced dynamic endpoints configured for access, by the connection agent and via one or more application programming interfaces, to a repository including a set of multiple access configurations for the processing entity. The operations of 1010 may be performed in accordance with examples as disclosed herein. In some examples, aspects of the operations of 1010 may be performed by an endpoint generation component 630 as described with reference to FIG. 6.

At 1015, the method may include generating random endpoint addresses associated with the one or more load balanced dynamic endpoints. The operations of 1015 may be performed in accordance with examples as disclosed herein. In some examples, aspects of the operations of 1015 may be performed by an endpoint generation component 630 as described with reference to FIG. 6.

At 1020, the method may include retrieving, via the one or more load balanced dynamic endpoints and from the repository, one or more first access configurations of the set of multiple access configurations, where the one or more first access configurations are associated with the processing entity. The operations of 1020 may be performed in accordance with examples as disclosed herein. In some examples, aspects of the operations of 1020 may be performed by a configuration retrieval component 635 as described with reference to FIG. 6.

A method for data processing at an application server is described. The method may include activating, in a processing entity, a connection agent and a manifest, the manifest including a data signature and an endpoint type that are associated with the processing entity, generating, based on the data signature, the endpoint type, or both, one or more load balanced dynamic endpoints configured for access, by the connection agent and via one or more application programming interfaces, to a repository including a set of multiple access configurations for the processing entity, and retrieving, via the one or more load balanced dynamic endpoints and from the repository, one or more first access configurations of the set of multiple access configurations, where the one or more first access configurations are associated with the processing entity.

An apparatus for data processing at an application server is described. The apparatus may include a processor, memory coupled with the processor, and instructions stored in the memory. The instructions may be executable by the processor to cause the apparatus to activate, in a processing entity, a connection agent and a manifest, the manifest including a data signature and an endpoint type that are associated with the processing entity, generate, based on the data signature, the endpoint type, or both, one or more load balanced dynamic endpoints configured for access, by the connection agent and via one or more application programming interfaces, to a repository including a set of multiple access configurations for the processing entity, and retrieve, via the one or more load balanced dynamic endpoints and from the repository, one or more first access configurations of the set of multiple access configurations, where the one or more first access configurations are associated with the processing entity.

Another apparatus for data processing at an application server is described. The apparatus may include means for activating, in a processing entity, a connection agent and a manifest, the manifest including a data signature and an endpoint type that are associated with the processing entity, means for generating, based on the data signature, the endpoint type, or both, one or more load balanced dynamic endpoints configured for access, by the connection agent and via one or more application programming interfaces, to a repository including a set of multiple access configurations for the processing entity, and means for retrieving, via the one or more load balanced dynamic endpoints and from the repository, one or more first access configurations of the set of multiple access configurations, where the one or more first access configurations are associated with the processing entity.

A non-transitory computer-readable medium storing code for data processing at an application server is described. The code may include instructions executable by a processor to activate, in a processing entity, a connection agent and a manifest, the manifest including a data signature and an endpoint type that are associated with the processing entity, generate, based on the data signature, the endpoint type, or both, one or more load balanced dynamic endpoints configured for access, by the connection agent and via one or more application programming interfaces, to a repository including a set of multiple access configurations for the processing entity, and retrieve, via the one or more load balanced dynamic endpoints and from the repository, one or more first access configurations of the set of multiple access configurations, where the one or more first access configurations are associated with the processing entity.

Some examples of the method, apparatuses, and non-transitory computer-readable medium described herein may further include operations, features, means, or instructions for receiving, from the connection agent, an access request indicating the one or more first access configurations and retrieving the one or more first access configurations based on the access request.

Some examples of the method, apparatuses, and non-transitory computer-readable medium described herein may further include operations, features, means, or instructions for mapping the one or more load balanced dynamic endpoints to one or more access configuration retrieval services associated with the set of multiple access configurations and retrieving the one or more first access configurations via the one or more access configuration retrieval services.

Some examples of the method, apparatuses, and non-transitory computer-readable medium described herein may further include operations, features, means, or instructions for disabling the one or more load balanced dynamic endpoints based on retrieving, via the one or more load balanced dynamic endpoints, the one or more first access configurations.

Some examples of the method, apparatuses, and non-transitory computer-readable medium described herein may further include operations, features, means, or instructions for disassociating the one or more load balanced dynamic endpoints from the processing entity and associating the one or more load balanced dynamic endpoints with a second processing entity.

Some examples of the method, apparatuses, and non-transitory computer-readable medium described herein may further include operations, features, means, or instructions for generating random endpoint addresses associated with the one or more load balanced dynamic endpoints.

Some examples of the method, apparatuses, and non-transitory computer-readable medium described herein may further include operations, features, means, or instructions for translating the one or more first access configurations from a first format to a second format that corresponds to the processing entity and transmitting the translated one or more first access configurations to the processing entity via the connection agent.

Some examples of the method, apparatuses, and non-transitory computer-readable medium described herein may further include operations, features, means, or instructions for monitoring for a presence of the processing entity and activating, in the processing entity, the connection agent based on detecting the presence of the processing entity.

Some examples of the method, apparatuses, and non-transitory computer-readable medium described herein may further include operations, features, means, or instructions for storing one or more records associated with activation of the connection agent, the manifest, or both, the generation of the one or more load balanced dynamic endpoints, a disablement of the one or more load balanced dynamic endpoints, a reassignment of the one or more load balanced dynamic endpoints, or any combination thereof.

In some examples of the method, apparatuses, and non-transitory computer-readable medium described herein, the one or more load balanced dynamic endpoints disallow connections from processing entities different than the processing entity.

In some examples of the method, apparatuses, and non-transitory computer-readable medium described herein, the set of multiple access configurations include one or more access control lists, one or more internet protocol address configurations, one or more domain name configurations, one or more permissions configurations, one or more access policy configurations, one or more network layer configurations, one or more transport layer configurations, one or more ingress block configurations, one or more egress block configurations, or any combination thereof.

In some examples of the method, apparatuses, and non-transitory computer-readable medium described herein, the data signature indicates a data format, a quantity of data, a data configuration rate, one or more dependent configurations, or any combination thereof.

In some examples of the method, apparatuses, and non-transitory computer-readable medium described herein, the endpoint type indicates a representational state transfer (REST) access point API model, a global remote procedure call (RPC) API model, an input schema, an output schema, or any combination thereof.

The following provides an overview of aspects of the present disclosure:

Aspect 1: A method for data processing at an application server, comprising: activating, in a processing entity, a connection agent and a manifest, the manifest comprising a data signature and an endpoint type that are associated with the processing entity; generating, based at least in part on the data signature, the endpoint type, or both, one or more load balanced dynamic endpoints configured for access, by the connection agent and via one or more application programming interfaces, to a repository comprising a plurality of access configurations for the processing entity; and retrieving, via the one or more load balanced dynamic endpoints and from the repository, one or more first access configurations of the plurality of access configurations, wherein the one or more first access configurations are associated with the processing entity.

Aspect 2: The method of aspect 1, further comprising: receiving, from the connection agent, an access request indicating the one or more first access configurations; and retrieving the one or more first access configurations based at least in part on the access request.

Aspect 3: The method of any of aspects 1 through 2, further comprising: mapping the one or more load balanced dynamic endpoints to one or more access configuration retrieval services associated with the plurality of access configurations; and retrieving the one or more first access configurations via the one or more access configuration retrieval services.

Aspect 4: The method of any of aspects 1 through 3, further comprising: disabling the one or more load balanced dynamic endpoints based at least in part on retrieving, via the one or more load balanced dynamic endpoints, the one or more first access configurations.

Aspect 5: The method of any of aspects 1 through 4, further comprising: disassociating the one or more load balanced dynamic endpoints from the processing entity: and associating the one or more load balanced dynamic endpoints with a second processing entity.

Aspect 6: The method of any of aspects 1 through 5, further comprising: generating random endpoint addresses associated with the one or more load balanced dynamic endpoints.

Aspect 7: The method of any of aspects 1 through 6, further comprising: translating the one or more first access configurations from a first format to a second format that corresponds to the processing entity; and transmitting the translated one or more first access configurations to the processing entity via the connection agent.

Aspect 8: The method of any of aspects 1 through 7, further comprising: monitoring for a presence of the processing entity; and activating, in the processing entity, the connection agent based at least in part on detecting the presence of the processing entity.

Aspect 9: The method of any of aspects 1 through 8, further comprising: storing one or more records associated with activation of the connection agent, the manifest, or both, the generation of the one or more load balanced dynamic endpoints, a disablement of the one or more load balanced dynamic endpoints, a reassignment of the one or more load balanced dynamic endpoints, or any combination thereof.

Aspect 10: The method of any of aspects 1 through 9, wherein the one or more load balanced dynamic endpoints disallow connections from processing entities different than the processing entity.

Aspect 11: The method of any of aspects 1 through 10, wherein the plurality of access configurations comprise one or more access control lists, one or more internet protocol address configurations, one or more domain name configurations, one or more permissions configurations, one or more access policy configurations, one or more network layer configurations, one or more transport layer configurations, one or more ingress block configurations, one or more egress block configurations, or any combination thereof.

Aspect 12: The method of any of aspects 1 through 11, wherein the data signature indicates a data format, a quantity of data, a data configuration rate, one or more dependent configurations, or any combination thereof.

Aspect 13: The method of any of aspects 1 through 12, wherein the endpoint type indicates a representational state transfer (REST) API model, a global remote procedure call (RPC) API model, an input schema, an output schema, or any combination thereof.

Aspect 14: An apparatus for data processing at an application server, comprising a processor: memory coupled with the processor; and instructions stored in the memory and executable by the processor to cause the apparatus to perform a method of any of aspects 1 through 13.

Aspect 15: An apparatus for data processing at an application server, comprising at least one means for performing a method of any of aspects 1 through 13.

Aspect 16: A non-transitory computer-readable medium storing code for data processing at an application server, the code comprising instructions executable by a processor to perform a method of any of aspects 1 through 13.

It should be noted that the methods described herein describe possible implementations, and that the operations and the steps may be rearranged or otherwise modified and that other implementations are possible. Further, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for data processing at an application server, comprising:
    monitoring for a presence of a processing entity;
    activating, in the processing entity and based at least in part on detecting the presence of the processing entity, a connection agent and a manifest, the manifest comprising a data signature and an endpoint type that are associated with the processing entity;
    generating, based at least in part on the data signature, the endpoint type, or both, one or more load balanced dynamic endpoints configured for access, by the connection agent and via one or more application programming interfaces, to a repository comprising a plurality of access configurations for the processing entity; and
    retrieving, via the one or more load balanced dynamic endpoints and from the repository, one or more first access configurations of the plurality of access configurations, wherein the one or more first access configurations are associated with the processing entity.

2. The method of claim 1, further comprising:
    receiving, from the connection agent, an access request indicating the one or more first access configurations; and
    retrieving the one or more first access configurations based at least in part on the access request.

3. The method of claim 1, further comprising:
    mapping the one or more load balanced dynamic endpoints to one or more access configuration retrieval services associated with the plurality of access configurations; and
    retrieving the one or more first access configurations via the one or more access configuration retrieval services.

4. The method of claim 1, further comprising:
    disabling the one or more load balanced dynamic endpoints based at least in part on retrieving, via the one or more load balanced dynamic endpoints, the one or more first access configurations.

5. The method of claim 1, further comprising:
    disassociating the one or more load balanced dynamic endpoints from the processing entity; and
    associating the one or more load balanced dynamic endpoints with a second processing entity.

6. The method of claim 1, further comprising:
    generating random endpoint addresses associated with the one or more load balanced dynamic endpoints.

7. The method of claim 1, further comprising:
    translating the one or more first access configurations from a first format to a second format that corresponds to the processing entity; and
    transmitting the translated one or more first access configurations to the processing entity via the connection agent.

8. The method of claim 1, further comprising:
    storing one or more records associated with the activation of the connection agent, the manifest, or both, the generation of the one or more load balanced dynamic endpoints, a disablement of the one or more load balanced dynamic endpoints, a reassignment of the one or more load balanced dynamic endpoints, or any combination thereof.

9. The method of claim 1, wherein the one or more load balanced dynamic endpoints disallow connections from processing entities different than the processing entity.

10. The method of claim 1, wherein the plurality of access configurations comprise one or more access control lists, one or more internet protocol address configurations, one or more domain name configurations, one or more permissions configurations, one or more access policy configurations, one or more network layer configurations, one or more transport layer configurations, one or more ingress block configurations, one or more egress block configurations, or any combination thereof.

11. The method of claim 1, wherein the data signature indicates a data format, a quantity of data, a data configuration rate, one or more dependent configurations, or any combination thereof.

12. The method of claim 1, wherein the endpoint type indicates a representational state transfer (REST) API model, a global remote procedure call (RPC) API model, an input schema, an output schema, or any combination thereof.

13. An apparatus for data processing at an application server, comprising:
    a processor;
    memory coupled with the processor; and
    instructions stored in the memory and executable by the processor to cause the apparatus to:
        monitor for a presence of a processing entity;
        activate, in the processing entity and based at least in part on detecting the presence of the processing entity, a connection agent and a manifest, the manifest comprising a data signature and an endpoint type that are associated with the processing entity;
        generate, based at least in part on the data signature, the endpoint type, or both, one or more load balanced dynamic endpoints configured for access, by the connection agent and via one or more application programming interfaces, to a repository comprising a plurality of access configurations for the processing entity; and retrieve, via the one or more load balanced dynamic endpoints and from the repository, one or more first access configurations of the plurality of access configurations, wherein the one or more first access configurations are associated with the processing entity.

14. The apparatus of claim 13, wherein the instructions are further executable by the processor to cause the apparatus to:
receive, from the connection agent, an access request indicating the one or more first access configurations; and
retrieve the one or more first access configurations based at least in part on the access request.

15. The apparatus of claim 13, wherein the instructions are further executable by the processor to cause the apparatus to:
map the one or more load balanced dynamic endpoints to one or more access configuration retrieval services associated with the plurality of access configurations; and
retrieve the one or more first access configurations via the one or more access configuration retrieval services.

16. The apparatus of claim 13, wherein the instructions are further executable by the processor to cause the apparatus to:
disable the one or more load balanced dynamic endpoints based at least in part on retrieving, via the one or more load balanced dynamic endpoints, the one or more first access configurations.

17. The apparatus of claim 13, wherein the instructions are further executable by the processor to cause the apparatus to:
generate random endpoint addresses associated with the one or more load balanced dynamic endpoints.

18. The apparatus of claim 13, wherein the instructions are further executable by the processor to cause the apparatus to:
translate the one or more first access configurations from a first format to a second format that corresponds to the processing entity; and
transmit the translated one or more first access configurations to the processing entity via the connection agent.

19. A non-transitory computer-readable medium storing code for data processing at an application server, the code comprising instructions executable by a processor to:
monitor for a presence of a processing entity;
activate, in the processing entity and based at least in part on detecting the presence of the processing entity, a connection agent and a manifest, the manifest comprising a data signature and an endpoint type that are associated with the processing entity;
generate, based at least in part on the data signature, the endpoint type, or both, one or more load balanced dynamic endpoints configured for access, by the connection agent and via one or more application programming interfaces, to a repository comprising a plurality of access configurations for the processing entity; and
retrieve, via the one or more load balanced dynamic endpoints and from the repository, one or more first access configurations of the plurality of access configurations, wherein the one or more first access configurations are associated with the processing entity.

* * * * *